(12) United States Patent
Aston et al.

(10) Patent No.: US 8,985,208 B2
(45) Date of Patent: Mar. 24, 2015

(54) FORMATION TREATMENT

(75) Inventors: Mark Shelton Aston, Middlesex (GB); Ian Gray, Rugby (GB)

(73) Assignee: BP Exploration Operating Company Limited, Middlesex (GB)

( * ) Notice: Subject to any disclaimer, the term of this patent is extended or adjusted under 35 U.S.C. 154(b) by 742 days.

(21) Appl. No.: 12/312,086

(22) PCT Filed: Oct. 19, 2007

(86) PCT No.: PCT/GB2007/004005
§ 371 (c)(1),
(2), (4) Date: Apr. 24, 2009

(87) PCT Pub. No.: WO2008/053156
PCT Pub. Date: May 8, 2008

(65) Prior Publication Data
US 2010/0139916 A1    Jun. 10, 2010

(30) Foreign Application Priority Data
Oct. 31, 2006  (EP) .................................... 06255601

(51) Int. Cl.
| | | |
|---|---|---|
| E21B 33/13 | (2006.01) |
| E21B 43/04 | (2006.01) |
| C09K 8/56 | (2006.01) |
| C04B 28/04 | (2006.01) |
| C09K 8/42 | (2006.01) |
| C09K 8/46 | (2006.01) |
| C09K 8/57 | (2006.01) |

(52) U.S. Cl.
CPC . *C09K 8/56* (2013.01); *C04B 28/04* (2013.01); *C09K 8/42* (2013.01); *C09K 8/46* (2013.01); *C09K 8/572* (2013.01)

USPC .......................................... 166/292; 166/278

(58) Field of Classification Search
None
See application file for complete search history.

(56) References Cited

U.S. PATENT DOCUMENTS

| | | | | |
|---|---|---|---|---|
| 3,044,547 | A | * | 7/1962 | Jarboe, Jr. ...................... 166/276 |
| 3,119,448 | A | * | 1/1964 | Rhoades ....................... 166/293 |
| 3,646,998 | A | | 3/1972 | Curtice et al. |
| 3,948,672 | A | * | 4/1976 | Harnsberger ................. 106/720 |
| 3,955,993 | A | | 5/1976 | Curtice et al. |
| 5,309,997 | A | | 5/1994 | Nahm et al. |
| 5,529,123 | A | * | 6/1996 | Carpenter et al. ............ 166/293 |

OTHER PUBLICATIONS

International Search Report for PCT/GB2007/004005, mailed Feb. 8, 2008.
Written Opinion of the International Searching Authority for PCT/GB2007/004005, mailed Feb. 8, 2008.
International Preliminary Report on Patentability for PCT/GB2007/004005, mailed Feb. 10, 2009.

* cited by examiner

*Primary Examiner* — Angela M DiTrani
(74) *Attorney, Agent, or Firm* — Nixon & Vanderhye P.C.

(57) ABSTRACT

Method of consolidating sand in a subterranean formation by contacting the sand in a first location in the presence of water with a slurry in a liquid medium of cement of average particle size less than 10 microns to produce a mixture including sand, water and cement, the slurry being injected into the formation to the location. A separation step is carried out in which a liquid hydrocarbon fluid is passed into the location to displace from the location at least some of the cement from the mixture. The volume ratio of liquid hydrocarbon fluid to the volume of the slurry injected to the formation is at least 5:1. The mixture is allowed to set to give permeable consolidated sand.

21 Claims, No Drawings

FORMATION TREATMENT

This application is the U.S. national phase of International Application No. PCT/GB2007/004005, filed 19 Oct. 2007, which designated the U.S. and claims priority to European Application No. 06255601.4, filed 31 Oct. 2006.

The present invention relates to the treatment of subterranean formations, in particular to the consolidation of sand in such formations.

Poorly consolidated formations comprising sand provide a problem when drilling through them and when recovering hydrocarbons e.g. oil from the drilled well. The loose sand enters the well bore by collapse of the walls or by being carried in by oil and/or water from the formation. Sand in the produced oil or water causes extra wear on pumps and the interior of pipes, or can fill the well bore with sand making future access into the well difficult. Existing solutions, which are mostly mechanical, include screens and gravel packs and extending the casing to cover the poorly consolidated region of the well bore.

A number of chemical methods for solving the problem have been described. One problem with chemical methods is the difficulty of consolidating the sand while at the same time retaining a permeable formation, so that oil and/or water can flow through it.

One proposal is described in U.S. Pat. No. 3,955,993 in which an oil wetted mixture of sand, cement and fine silica, is dispersed in water and applied to sand followed by separation of the water, and treatment with an aqueous curing agent. The system is designed to form a permeable barrier/sheath which acts as a filter to prevent loose sand passing through the formation and into the well bore. The method appears to be complex. U.S. Pat. No. 3,646,998 describes a similar method in which a treating composition comprises sand, cement, silica flour and a petroleum oil fraction containing an oil-wetting agent therein to oil-wet the sand, cement and silica flour particles. The treating composition is suspended in an aqueous carrier medium and injected against an unconsolidated formation.

U.S. Pat. No. 5,309,997 describes a method for consolidating incompetent formations penetrated by a borehole using drilling fluids. The method uses a water-based drilling fluid, the solids content of which includes microfine-ground blast furnace slag. This provides a fluid that will penetrate the incompetent formation before the filter cake is formed on the formation's face. This has the effect of consolidating the formation, sealing off the formation fluids and providing a filter cake which is compatible with the cement used to cement the casing into the borehole. However, this method fills the pores in the formation and seals off the formation fluids.

There remains, therefore, a problem of how to produce a sand formation which is both consolidated and permeable.

It has been found that use of cement of very small particle size coupled, if required, with removal of any excess of the cement produces a consolidated and permeable sand formation.

The present invention provides a method of consolidating sand in a subterranean formation, which method comprises:

(i) contacting said sand in a first location in the presence of water with a slurry in a liquid medium of cement of average particle size less than 10 microns to produce a mixture comprising sand, water and some of the cement, and a remainder comprising the rest of the cement, (ii) separating in said location said remainder from said mixture, (iii) which mixture is allowed to set to give permeable consolidated sand.

Alternatively, step (ii) may involve separating in said location at least part of said remainder from at least part of said mixture.

In another aspect, a method of consolidating sand in a subterranean formation comprises:

(i) contacting said sand in a first location in the presence of water with a slurry in a liquid medium of cement of average particle size less than 10 microns to produce a mixture comprising sand, water and cement, (ii) separating from said location at least some of the cement from said mixture, (iii) which mixture is allowed to set to give permeable consolidated sand.

By removing some of the cement before the mixture sets, at least some of the pores in the formation are left and so the formation remains permeable.

The separation step may remove cement such that the amount of cement retained in the mixture is 3-25%, 3-15% or optionally 4-11% by weight of the slurry.

In a modification of the above method, the present invention provides a method of consolidating sand in a subterranean formation which method comprises:

(i) contacting said sand in a first location in the presence of water with a slurry in a liquid medium of cement of average particle size less than 10 microns in a concentration of 3-15% by weight to produce in said medium a mixture comprising sand, water and cement and (iii) allowing said mixture to set to give a permeable consolidated sand.

The selected range for the cement concentration enables the formation to be consolidated whilst leaving at least some of the pores in the formation unblocked.

According to another aspect of the invention, a method of consolidating sand in a subterranean formation comprises:

(i) contacting said sand in a first location in the presence of water with a slurry in a liquid medium of cement of average particle size less than 10 microns to produce a mixture comprising sand, water and cement, the cement being present in the mixture in a first amount of between 3 and 15% by weight of the slurry; and (iii) allowing the mixture to set to give permeable consolidated sand.

In one embodiment of this aspect, the slurry contains, before the contacting step (i), an amount of cement greater than the first amount, the method comprising the additional step (ii) of separating, from said location, excess cement from the mixture to leave the first amount of cement in the mixture.

In another embodiment, the amount of cement present in the slurry before the contacting step (i) is equal to the first amount.

All percentages in this specification are by weight unless otherwise mentioned.

The cement is usually a Portland cement, and may be made by known methods in which a calcareous material, such as limestone or chalk is reacted with a substance comprising alumina, silica and/or iron oxide such as clay or shale. The reaction is usually at a high temperature such as about 1400° C. in a rotary kiln to form balls of clinker, which are cooled and ground to a powder. A small amount of gypsum is/may be mixed with the powder. The mixture obtained may then be re-ground and fractionated to the desired average particle size.

The average particle size of the cement for use in the method of the invention is less than 10 microns, such as 0.1-10 microns preferably 0.5-6 microns, especially 1-5 microns. The particle size distribution is usually such that at least 60, 70 or 80% is less than 16 or especially less than 10 microns, preferably at least 40 or 50% is less than 8 microns, in particular at least 25 or 30% is less than 5 or 4 microns. Preferably at least 90% is less than 16 or especially less than 10 microns, at least 70 or 75% is less than 8 microns, at least 50 or 55% is less than 5 microns and at least 40% is less than 4 microns. The preferred D50 value for the cement particles is 1-7 microns, particularly 1-5, 2-6 or especially 1-3 microns such as preferably less than 5 micron such as less than 3 micron, or below 1 micron. Especially for the preferred cements having a D50 value of 2-6 such as 3-5 microns, at least 10% is less than 3 microns and preferably less than 5% is less than 0.5 microns. The particle size distribution is preferably such that at least 90% is less than 10 micron; in particular at least 90% is less than 5 microns, especially with an average of 1-3 microns. In another embodiment the preferred cements have an average particle size of 1-3 microns, such as 1.5-2.5 microns, in which case the preferred D90 value is not more than 2 microns, the preferred D50 value is not more than 0.5 microns and the preferred D10 value is not more than 0.1 microns. The particle size distribution may be determined on an optionally ultrasonified dispersion of the cement in a liquid hydrocarbon, optionally with a suitable dispersant using a commercial laser diffraction particle sizer. The average particle size is a volume average. The size of the particles denoted by the expression D50 or D90 means the size below which there were 50 or 90% respectively of the total volume of the particles.

The cement is injected into the formation to the first location as a slurry in a liquid medium. The slurry preferably may contain sand of 12-80 US mesh size sand, in particular 20-40 US mesh size sand but is preferably substantially free of such sand. The slurry may also contain finely ground silica capable of passing through the openings of a 200-325 US size Sieve but is also preferably substantially free of that silica. The slurry is also usually substantially free of sand of larger size than the average size of sand in the formation in the first location being treated with the cement slurry.

The slurry may contain 3-80% cement. In one embodiment when the method of this invention does not involve a separation step [ii], the amount of cement may be in particular 3-25% or especially 3-15%, preferably 4-11%; in this embodiment an aqueous slurry of the cement of this concentration will usually contain insufficient cement to set solid at room temperature when the cement in the slurry is kept moving e.g. stirred, though it may set if the cement in the slurry is allowed to settle. Alternatively the slurry may contain 25-80% of cement, such as 35-75% or 55-73%, particularly when a separation step [ii] is used.

The slurry may be in a medium, which is aqueous, or organic, or may be an emulsion An aqueous medium is preferably made with fresh, brackish, produced or connate water. The aqueous slurry may be made by submitting a mixture of the water and cement to high shear. Preferably however the high shearing is performed in the presence of at least one surface active compound so that the aqueous slurry also contains at least one surface active compound such as a dispersant or water wetting agent e.g. in amount of at least 0.01% or 0.05% preferably 0.05-10 e.g. 0.1-10%, such as 0.5-5%; the slurry usually contains at least an effective amount of the surface active compound to produce the slurry. The dispersant is to disperse the cement particles in the aqueous medium, while the water wetting agent is to water wet the cement in the slurry and/or the sand being treated in the first location; the dispersant and the water wetting agent may or may not be the same material. The surface active compound may be cationic or non ionic, but is preferably anionic, in particular with at least one carboxyl and/or sulphonate group. Suitable water wetting agents include alkyl, aryl and alkaryl sulphonates and sulphates, and esters and ether esters of natural fats or oils or long chain carboxylic acids or alkyl phenols; examples of the latter groups are polyethyleneoxylated-sorbitan mono C10-18 aliphatic carboxylic acids or -alkyl phenols or polyoxyalkylene ethers. One family of examples of suitable dispersants for the cement in aqueous slurries is organic sulphonates, both monomeric and polymeric ones and ones of high and low molecular weight, in particular ones with a high molecular weight backbone carrying pendant sulphonate groups, such as lignosulphates, petroleum sulphonates and poly [styrene sulphonates]. Another family of suitable dispersants is acidic alkoxylated polymers or poly alkoxycarboxylates, which contain a structural unit from an alcohol, which may be a fatty alcohol, a structural unit from a polyalkyleneoxy unit and an oxyalkylenecarboxyl unit; the latter may be made by reacting chloroacetate with an alcohol ethoxylate, or reacting an acrylic ester with an alcohol ethoxylate in the presence of alkali. Examples of such dispersants are ones sold under the trade name SOLPLUS D540 by Noveon, Lubrizol. The aqueous medium may if desired contain at least one setting accelerator, such as calcium chloride e.g. in an amount of 0.1-10% by weight or at least one setting retarder, such as sucrose; preferably the medium is substantially free of setting accelerators.

The organic medium may be a substantially water immiscible one especially a liquid hydrocarbon, such as one of at least 5 carbon atoms e.g. kerosene, diesel oil or produced oil, or an organic drilling fluid. The slurry may be made by high shear mixing the cement and the medium, but this operation is preferably performed in the presence of at least one surface active compound such as a dispersant or water wetting agent e.g. in amount of at least 0.01% or 0.05% preferably 0.05-10 e.g. 0.1-10%, such as 0.5-5%; the slurry usually contains at least an effective amount of the surface active compound to produce the slurry. The dispersant is believed to oil wet the cement. The dispersant or oil wetting agent is usually non ionic and a water insoluble organic compound with at least 1 e.g. 1-5 or 1-3 long chain e.g. fatty aliphatic hydrocarbyl groups, as well as at least 1 e.g. 1-20 or 2-10 polar group, which usually has at least one e.g. 1-10 hydroxyl, amine or amide group or a polyether derivative thereof, or a polyether group itself; the long chain may have 10-20 such as 12-18 carbons such as stearyl, oleyl, lauryl and tridecyl. Examples of families of such compounds are fatty esters and ethers of diols and polyols, such as ethylene and propylene glycol, glycerol, sucrose and sorbitan; examples of the fatty group are those given above for the long chain group. The long chain or fatty group may also be a substituent in an aryl e.g. phenyl group as in long chain alkyl phenyl polyethylenoxylates such as nonyl phenyl ethoxylates. The long chain or fatty group may also be in a molecule with an amine or amide group as sole polar group[s] or with other types of polar group such as ether, especially polyether group, as in amine derivatives of fatty acid products from polyethers. Preferred dispersants or oil wetting agents are fatty acid condensation polymers and amine derivatives thereof, such as those sold by Lubrizol under the trade names SOLSPERSE and SOLPLUS. The dispersant or oil wetting agent may have a Hydrophilic-Lipophilic Balance [HLB] value of 1-10. In particular the HLB value may be 6-10 such as for esters or ethers of fatty acids or alcohols [e.g. where the fatty group is as exemplified above] with polyethylenoxylates such as polyoxyethylenoxylates [e.g. with 2-6 oxyethylene units] preferably as in polyethylene glycols PEG200-400.

The slurry may also be an emulsion which may be an oil in water [o/w] emulsion but is preferably a water in oil [w/o] one. The emulsion usually contains a minority of the disperse phase such as 1-40% or 10-30%. Such emulsions comprise water, which may be in the form specified for the aqueous slurries, an oil which may be one of those exemplified for organic slurries, and a surface active compound which may be in one of those types mentioned above for the dispersants or either type of wetting agent. For w/o emulsions HLB values of 3-9 preferably 3-6 or especially 6-9 may be used, while for o/w emulsions HLB values of 8-15 may be used.

If desired the organic slurry or the oil part of the emulsion may comprise a polar produced-oil having acid, asphaltene and/or maltene polar groups, such as one having an acid value expressed as mg KOH/g of at least 0.1 such as 0.1-8 e.g. 0.5-6 preferably 1.5-4. Use of a polar oil may enable the slurry to be made with less dispersant/wetting agent than specified above or with no added dispersant/wetting agent.

If desired the slurry may contain at least one thickener to reduce the rate of settling of the cement particles. Examples of such thickeners for aqueous slurries are hydroxyethylcellulose, polyacrylic acids and polyacrylamides and for organic slurries are organophilic clays, known to those skilled in the art. Amounts of thickeners in the slurry may be 0.1-10% such as 0.5-5%. Thickeners are especially used in the more dilute slurries e.g. of less than 40% cement.

Dispersants are especially used in the more concentrated slurries e.g. of 55-75% but may also be used with other slurries e.g. of 25-55%. Consolidated sands of unconfined compressive strength (a mechanical property known by those skilled in the art) of more than 100 psi (0.69 MPa) can be obtained with 35-55% aqueous cement slurries without added dispersant, especially with larger particle sands such as ones not passing mesh size of 150 US mesh, especially 35 mesh.

The slurry in an aqueous medium may have a viscosity at 25° C. in the range 5 centipoise (cP) to 1000 cP, especially 10-500 or 20-100 cP.

The slurries in an organic medium may have a viscosity at 25° C. of 10-1000 cP especially 10-500 or 20-100 cP.

The sand to be treated in the first location is usually weakly-consolidated, loose or friable. The sand may be of US mesh size 650-15 (22-1300 micron), e.g. 600-150 (25-100 micron) [fine], 150-35 (100-500 micron) [medium], or 35-15 (500-1300 micron) [coarse]. Advantageously the sand has a particle size at least 5 times the average size of the cement particles; the sand preferably has a D50 value of 5-500, e.g. 15-500 or 30-400, but especially 30-100 or 100-300 microns.

When an aqueous slurry of cement is passed to contact the sand, the sand may be de-oiled in a pre-flush step to increase the water wettability of the sand. When an organic slurry is passed to contact water-wet sand, the slurry preferably contains at least one dispersant or surfactant which may be one suitable for use with organic slurries or one for use with aqueous slurries, both particularly as exemplified above, or may be a mixture of both, preferably in the above specified amounts. If desired a surfactant of HLB value of 4-10 preferably 6-10 may be used in the organic slurry to disperse the cement in the organic in the preparation of the slurry and also to help transfer the dispersed cement in use from the slurry to the water in the presence of the sand.

The weight ratio of cement in the slurry to sand in the location to be treated is usually 1-500:100, such as 2-200:100 or 3-150:100, preferably 20-120:100 with separation step [ii] and 3-35:100 particularly without separation step [ii]. The weight ratio of slurry to sand is usually 2-100:10 such as 5-20:10

The cement slurry is injected into a well bore and thence into the formation to the first location to meet the sand, which is due to be consolidated. This location may be in the wall of the well bore, from which loose sand can fall out and down the bore, or be spaced from the well bore e.g. in sandy strata extending therefrom or extending from a permeable stratum, itself extending from the well bore. Preferably the sand to be treated in the first location is spaced from the well bore wall up to 30 cm such as 1-30 cms, or especially up to 15 cm such as 5-15 cm. The region of the well bore above and below said strata may be closed with casing, leaving the cement slurry to enter the strata. The slurry may be passed in a coiled tube from the surface down the well bore ending at the desired strata for the first location where the sand is to be treated. The cement slurry may be forced into the formation to the location by a surface pump. The well bore may have any inclination including none, but is preferably substantially vertical or with an inclination to the vertical of up to 20 degrees, however it may have a significant inclination to the vertical such as 30-about 85 degrees e.g. substantially horizontal ones.

The water for curing the cement in the first location may be derived from the water in an aqueous slurry or in an emulsion, or from use of water wet sand or sand carrying only residual attached water. The water wet sand may if required be obtained by use of a pre-flush of the formation in the first location with water, such as one of those mentioned above for making the aqueous slurry.

The cement slurry contacts the sand in the location to form [a] a mixture comprising cement and sand particles, which carry associated water, and [b] usually a remainder comprising remnants of the slurry comprising the rest of the cement. It is believed that the cement occupies the pore space and the water wets the sand particles.

In the main method of the present invention, the passage of the slurry is usually followed as soon as possible with the separation step [ii], especially with a post-flush of fluid preferably without delay and especially immediately. The separation step [ii] usually comprises passing a fluid through the location to separate at least some, and preferably substantially all, of the slurry remainder from the mixture. The fluid may be passed in to the first location to displace at least some of the remainder of the slurry, its direction of passage being preferably the same as the direction of the original injection of the cement slurry. If desired the fluid may be passed in a different direction to that original injection, in particular when the fluid is crude oil. In this latter case the location containing the mixture and the remainder of the slurry can be back flushed with produced oil to carry the remainder back towards the well bore and leave the mixture behind to set. The fluid passed through the location to separate the slurry remainder from the mixture may be aqueous, e.g. of the same or a different ionic strength from any water used in the cement slurry but is preferably organic, especially a substantially water immiscible one such as a liquid hydrocarbon, e.g. kerosene, diesel oil or crude/produced oil; it may also be a gas such as carbon dioxide or natural gas. The fluid is usually passed until at least the majority of the remainder of the cement slurry has been forced away from the first location. The volume ratio of the liquid hydrocarbon fluid to the original volume of slurry is usually at least 5:1, preferably 10:1 such as 5-20:1. The passage of fluid is then stopped, the well shut in and the cement, sand and water allowed to set.

If the slurry was applied in step [i] in an aqueous medium, then the fluid may also be aqueous but is preferably organic, e.g. as described above. If the slurry was in an organic medium or emulsion, then the fluid in the separation step is usually organic, which may be the same or different from the organic in the slurry. If desired the organic may be the same in both steps but the fluid may be substantially free of any dispersant or oil wetting agent. In the case of the modified method of the invention, the cement slurry, which may be organic or an emulsion but is preferably aqueous, contacts the sand at the location in the formation, and then, without any separation step, [i.e. without passage of the above fluid], the cement, sand and water are allowed to set.

Various procedures may be used if desired or needed to help the setting of the cement sand and water, especially in the cases of use of a slurry which is organic or an emulsion.

If the slurry was aqueous, then whether the separation step is used or not, there is usually enough water and cement present with the sand to enable setting to occur. If desired the aqueous slurry can be destabilized by changing its pH or water activity, such as ionic strength or molality, with a post flush of appropriate fluid such as an aqueous acid [for pH sensitive dispersants] or water of higher or lower ionic strength [e.g. fresh or connate water] or a soluble carbohydrate such as sugar.

In the case of use of an organic slurry, there may also be enough water and cement with the sand for setting. However the amount of cement with the sand may be increased by a number of procedures reducing the tendency of the cement to stay in the organic, preferably to increase the transfer of cement from the organic to the water on the sand. The organic slurry in the mixture can be destabilized to cause separation of cement by passing an appropriate fluid to change its composition. The appropriate fluid may be a different organic or one free of dispersant, or one containing a different dispersant [which stabilizes the cement slurry in the mixture less well] or one containing an agent capable of changing the dispersing stabilizing power of the dispersant already present such as an organic soluble acid [with pH sensitive dispersants]. When the organic slurry is based on crude oil containing polar compounds, the destabilizing fluid may a crude oil with a much lower level of polar compound or another organic without dispersant. The destabilizing may simply deposit the cement but preferably it preferentially directs it to the water on the sand. This may be achieved by use of a fluid containing a surface active agent capable of dispersing cement in aqueous media, such as one specified above in connection with aqueous slurries. In this case for example the organic slurry may be formed with a surface active agent of low HLB such as 3-6 and the fluid may contain an oil soluble one of high HLB such as 10-14; it is also possible for the organic slurry to contain a dispersant of HLB such as 6-10 so that in contact with the water in the sand the cement becomes water wetted and contacts the sand.

If the slurry is an emulsion then the methods of destabilizing it can include those mentioned for use with organic slurries.

The fluid destabilizing the slurries may be used in the separation step [ii] but preferably it is passed in a further step [iv] after the separation step (if present) but before the setting step (iii). Thus in a preferred process an organic slurry of cement is passed in step [i], an organic fluid is passed in step [ii] to separate excess of cement from the mixture and then in step [iv] a further fluid is passed to destabilize the slurry with cement in the mixture, preferably to transfer the cement to the water associated with the sand. In embodiments in which the concentration of cement in the slurry is 3-15% by weight and there is no separation step, step (iv) in which a further fluid is passed to destabilise the slurry is carried out before the setting step (iii).

The sand may also be pre-treated before step [i] with an agent which will cause destabilization of the slurry on contact with it. Thus in the case of aqueous slurries the sand may be pre-treated with water of different pH or water activity or ionic strength. In the cases of organic or emulsion slurries examples of suitable conditions or agents are given above.

The operations (i) and (iii); and (ii) and [iv] if used, are performed at the temperature of the sand at the first location which may be 25-150° C. such as 80-120° C.

The methods of the present invention can provide sand formations of increased compressive strength, but still with acceptable permeability. The Unconfined Compressive Strength of the consolidated sand may be 100-1500 psi (0.69-10.35 MPa), but is usually at least 200 psi (1.38 MPa), preferably at least 300 psi (2.07 MPa) and especially at least 500 or 700 psi (3.45 or 4.83 MPa), and may be up to 1500 psi or 1000 psi (10.35 or 6.9 MPa), such as 400-800 psi [2.76-5.52 Mpa] or 700-1000 psi [3.45-6.9 Mpa]. The retained permeability to oil may be at least 40% of the permeability to oil of the original unconsolidated formation. Particularly valuable consolidated sands of Unconfined Compressive Strength of at least 700 psi [4.83. Mpa] may be obtained with 65-73% aqueous cement slurries with added dispersant, especially with larger particle sands such as ones not passing mesh size of 150 US mesh, especially 35 mesh.

The invention is illustrated in the following Examples.

EXAMPLES

In each Example sand consolidation experiments were performed as follows.

A disk of stainless steel mesh of at most 380 microns was placed at the bottom of an upright cylinder fitted with an outlet tube leading to a vessel to which vacuum could be applied. Sand (50 ml, approx. 90 g) was poured into the cylinder (25 mm in diameter) and retained by the disk. This was followed by de-ionized water or kerosene (sold under the Trademark CLAIRSOL 370) to saturation.

Cement slurries [100 g] were prepared by addition of water to dry cement powder followed by dispersion of the solid either by high shear mixing (IKA Ultra-Turrax T25 mixer for 2 min at 24000 rpm) or by high shear mixing and a dispersant (an acidic alkoxylated polymer sold as SOLPLUS D540 by Noveon, Lubrizol). The slurry was then poured slowly into the cylinder and vacuum was applied to obtain aqueous material which had passed through the sand. In Ex 1-3, 5-7, just before the level of slurry in the cylinder reached the surface of the sand, kerosene was poured immediately into the cylinder and drawn through the sand by vacuum pump. The eluate collecting in the vessel was cloudy at least during at least some of the kerosene wash; the cloudiness was due to the presence in the kerosene eluate of the water and cement from the aqueous slurry displaced from the pore space between the sand particles. In the case of Ex4, the aqueous cement slurry was drawn through the sand until the level reached the surface of the sand and the bottom of the cylinder capped, to prevent loss of slurry from the sand. In the case of Ex 2 the setting was performed with the sand still under kerosene.

In all cases the sand, cement and water were allowed to stand at room temperature and to set over about two days to give a core of consolidated sand, which was removed from the cylinder and examined for permeability to air by forcing air through it and for consolidation.

The sands used were as follows: Sand A was a 1000-600 micron sieved fraction of 20-30 US mesh size Ottawa Sable sand. It had a D10 value of 655 microns, D50 of 803 and D90 of 994. Virtually all the sieved fraction had a particle size in the 600-1000 micron range. Sand B was a sand low in iron of 40-100 US Mesh having a D10 value of 177 microns, D50 value of 234 microns and D90 value of 320 microns. The particle sizes and distributions to give D10, D50 and D90 values (the size below which there were 10, 50 or 90% respectively of the total weight of particles) were determined on an aqueous suspension of the sand using a Microtrac S 3500 laser diffraction particle sizer.

The cement used in all the Examples was that sold as SQUEEZECRETE cement by Schlumberger. The particle size distribution and particle size percentiles e.g. D50 were determined as an ultrasonified suspension in kerosene using the above laser diffraction particle sizer set to handle irregular shape particles (rather than spherical ones), and with and without the presence of 1% of a fatty acid condensation polymer dispersant sold by Lubrizol under the SOLSPERSE/SOLPLUS Mark. The particle size distribution gave values of D10 of 1.8 microns, D30 of 2.8 microns, D50 of 3.94 microns, D70 of 5.56 microns, D90 of 8.71 microns and D95 of 10.8 microns.

The results were as follows in Table 1.

TABLE 1

| Ex | Sand | Wt % cement in slurry | Wt % dispersant in slurry | Kerosene Flush | UCS Psi (MPa) |
|---|---|---|---|---|---|
| 1 | A | 50 | 0 | Yes | 126 (0.87) |
| 2 | A | 60 | 0.5 | Yes | 266 (1.83) |
| 3 | A | 70 | 1.0 | Yes | 956 (6.59) |
| 4 | B | 5 | 0.08 | No | 125 (0.86) |
| 5 | B | 30 | 0.5 | Yes | 215 (1.48) |
| 6 | B | 40 | 0 | Yes | 185 (1.28) |

In Ex 4 double the amount of cement slurry was used compared to that used in all other experiments.

The cement slurries of Ex 1-3 were mobile and did not separate on standing until set.

The expression UCS used in the "sixth column in Table 1 means Unconfined Compressive Strength and was determined as follows. Cylindrical samples of consolidated sand of approximate dimensions 25 cm diameter by 50 cm length were compressed longitudinally, using a load frame and hydraulic piston. The piston was moved at a rate of 0.15 mm/minute. The pressure required to break the sample, i.e. the maximum pressure that could be sustained across the sample, was recorded in psi (lb per sq inch)

In all cases, air was easily forced through the cylinders of consolidated sand showing good permeability.

Example 7

The process of Ex 1 was repeated with Sand A, an aqueous 60% cement slurry containing 0.5% of the dispersant and a kerosene flush, but the sand was pre-wetted with kerosene (rather than water) before addition of the cement slurry and the kerosene was allowed to drain from the sand/cement/water mixture after the kerosene flush and before the setting.

The UCS value for the consolidated product of Ex 7 was 318 psi (2.19 MPa), and the permeability to air was good.

The invention claimed is:

1. A method of consolidating sand in a subterranean formation, which method comprises:
   (i) contacting said sand in a first location in the presence of water with a slurry in a liquid medium of cement wherein the liquid medium is an organic liquid medium or a water in oil emulsion, wherein the sand to be consolidated in said first location is spaced from a well bore wall, and the cement is of average particle size less than 10 microns, said slurry being substantially free of sand of larger size than the average size of sand in said location, to produce a mixture comprising said sand in said first location, water and cement, the slurry being injected into the formation to said location;
   (ii) passing a liquid hydrocarbon fluid into said location to displace from said location at least some of the cement from said mixture; and
   (iii) allowing the mixture to set to give a permeable consolidated sand.

2. The method according to claim 1 wherein the cement slurry contains 25-80% by weight of cement.

3. The method according to claim 2 wherein the cement slurry contains 45-75% by weight of cement.

4. The method according to claim 1 wherein the sand in said first location has a particle size of 600-1200 microns and the cement concentration is 35-75% by weight.

5. The method according to claim 4 wherein the cement concentration is 55-75% by weight.

6. The method according to claim 1 wherein the cement slurry contains at least one thickener when the cement concentration is less than 40% by weight, and contains at least one dispersant when the cement concentration is 65-80% by weight.

7. The method according to claim 1 wherein the cement has an average particle size of 0.5-5 microns.

8. The method according to claim 1 wherein the cement has at least 70% of particles less than 10 microns.

9. The method according to claim 1 wherein the cement is in a slurry in an aqueous liquid medium.

10. The method according to claim 1 wherein the sand in said first location has a particle size of 30-1500 microns.

11. The method according to claim 1 wherein the volume ratio of liquid hydrocarbon fluid to the volume of the slurry injected to the formation is at least 5:1.

12. The method according to claim 1 wherein the sand to be consolidated in the first location is spaced 1-30 cm from the well bore wall.

13. The method according to claim 1 wherein the sand to be consolidated in the first location is also located in the well bore wall.

14. A method of consolidating sand in a subterranean formation which method comprises:
   (i) contacting said sand in a first location in the presence of water with a slurry in a liquid medium of cement wherein the liquid medium is an organic liquid medium or a water in oil emulsion wherein the sand to be consolidated in said first location is spaced from a well bore wall, and the cement is of average particle size less than 10 microns in a concentration of 3-15% by weight, said slurry being substantially free of sand of larger size than the average size of sand in said location, to produce in said medium a mixture comprising said sand in said first location, water and cement; and
   (ii) setting said mixture to give a permeable consolidated sand.

15. The method according to claim 14 wherein the slurry contains at least one thickener.

16. The method according to claim 14 wherein the cement has an average particle size of 0.5-5 microns.

17. The method according to claim 14 wherein the cement has at least 70% of particles less than 10 microns.

18. The method according to claim 14 wherein the cement is in a slurry in an aqueous liquid medium.

19. The method according to claim 14 wherein the sand in said first location has a particle size of 30-1500 microns.

20. A method of consolidating sand in a subterranean formation, which method comprises:
(i) contacting said sand in a first location in the presence of water with a slurry in a liquid medium of cement wherein the liquid medium is an organic liquid medium or a water in oil emulsion, wherein the sand to be consolidated in said first location is spaced from a well bore wall, and the cement is of average particle size less than 10 microns and said slurry being substantially free of sand of larger size than the average size of sand in said location, to produce a mixture comprising said sand in said first location, water and cement, in which, before the contacting step, the slurry contains an amount of cement greater than said amount of cement in the mixture; and
(ii) allowing the mixture to set to give a permeable consolidated sand.

21. The method as claimed in claim 20 comprising the additional step (iii) of separating, from said location, excess cement from the mixture by passing a fluid through said location to carry away excess cement.

* * * * *